United States Patent
Makino et al.

(10) Patent No.: US 9,771,900 B2
(45) Date of Patent: Sep. 26, 2017

(54) FUEL VAPOR PROCESSING APPARATUS

(71) Applicant: AISAN KOGYO KABUSHIKI KAISHA, Obu-shi, Aichi-ken (JP)

(72) Inventors: Katsuhiko Makino, Aichi-ken (JP); Atsushi Sugimoto, Obu (JP); Keisuke Wakamatsu, Kariya (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 34 days.

(21) Appl. No.: 15/082,340

(22) Filed: Mar. 28, 2016

(65) Prior Publication Data
US 2016/0298578 A1 Oct. 13, 2016

(30) Foreign Application Priority Data
Apr. 10, 2015 (JP) .................. 2015-080657

(51) Int. Cl.
*F02M 25/08* (2006.01)
*B01D 53/04* (2006.01)
*B60K 15/00* (2006.01)
*F02M 35/10* (2006.01)
*F02D 41/00* (2006.01)

(52) U.S. Cl.
CPC ......... *F02M 25/0836* (2013.01); *B01D 53/04* (2013.01); *B60K 15/00* (2013.01); *F02D 41/004* (2013.01); *F02M 35/10222* (2013.01); *B01D 2253/102* (2013.01); *B01D 2259/4516* (2013.01); *F02M 2025/0845* (2013.01)

(58) Field of Classification Search
CPC ............... F02M 25/08; F02M 25/0809; F02M 25/0836; F02M 35/10222; F02M 2025/0845; F02D 41/00; F02D 41/004; B01D 53/04
See application file for complete search history.

(56) References Cited

U.S. PATENT DOCUMENTS

| | | | |
|---|---|---|---|
| 6,247,458 B1 | 6/2001 | Heinemann et al. | |
| 6,814,063 B2 * | 11/2004 | Kawano | F02M 25/08 123/516 |
| 7,036,359 B2 * | 5/2006 | Hayakawa | F02M 25/0809 73/114.39 |
| 9,556,828 B2 | 1/2017 | Weigl | |
| 2004/0025851 A1 | 2/2004 | Krimmer et al. | |

FOREIGN PATENT DOCUMENTS

| | | |
|---|---|---|
| DE | 19831188 A1 | 1/2000 |
| DE | 10236387 A1 | 2/2004 |
| DE | 102010048313 A1 | 4/2012 |
| JP | 2002-188530 A | 7/2002 |
| JP | 2007-198267 A | 8/2007 |

OTHER PUBLICATIONS

German Patent Application No. 10 2016 004 381.4, Office Action dated Apr. 20, 2017 (10 pages).

* cited by examiner

*Primary Examiner* — Hieu T Vo
(74) *Attorney, Agent, or Firm* — Conley Rose, P.C.

(57) ABSTRACT

A fuel vapor processing apparatus may include a canister. A negative pressure applying device for applying a negative pressure to the canister may be disposed in a purge passage communicating between the canister and an intake pipe of an engine. A pressure adjusting device may be disposed in a portion of the purge passage communicating between the fuel tank and the negative pressure applying device.

12 Claims, 2 Drawing Sheets

FUEL VAPOR PROCESSING APPARATUS

CROSS-REFERENCE TO RELATED APPLICATIONS

This application is based upon and claims priority to Japanese Patent Application Serial No. 2015-080657 filed on Apr. 10, 2015, the contents of which are incorporated in their entirety herein by reference in their entirety for all purposes.

STATEMENT REGARDING FEDERALLY SPONSORED RESEARCH OR DEVELOPMENT

Not applicable.

BACKGROUND

The disclosure generally relates to a fuel vapor processing apparatus for processing fuel vapor that may be generated in a fuel tank.

A known fuel vapor processing apparatus may include a canister for adsorbing fuel vapor generated in a fuel tank, an atmospheric passage for communicating the canister with the atmosphere, a vapor passage for communicating between the fuel tank and the canister, a purge passage for communicating between the canister and an intake pipe that may supply air to an internal combustion engine, a negative pressure applying device that may apply a negative pressure to the canister for adsorbing fuel vapor from within the canister, and a pressure regulating device for regulating the negative pressure applied by the negative pressure applying device. Fuel vapor generated in the fuel tank may flow from within the fuel tank to the canister via the vapor passage, so that the canister can adsorb the fuel vapor. For desorbing the adsorbed fuel vapor from within the canister, the negative pressure applying device may apply the negative pressure to the canister, so that the fuel vapor may be desorbed from within the canister and may then be supplied to the intake pipe via the purge passage.

This type of fuel vapor processing apparatus is disclosed, for example, in Japanese Laid-Open Patent Publication No. 2002-188530. In this publication, a vacuum pump is disposed in the purge passage and may serve as the negative pressure applying device. An electromagnetic valve is also disposed in the purge passage and may serve as the pressure regulating device. The electromagnetic valve may be controlled with respect to a duty ratio by an engine control unit (ECU) of a vehicle engine, so that an open ratio of the vapor passage may be controlled. The electromagnetic valve may be disposed in a portion of the purge passage between the vacuum pump (negative pressure applying device) and the intake valve. Thus, in this publication, the pressure regulating device is disposed on a downstream side of the pressure applying device with respect to a direction of flow of a purge gas (i.e., a mixture of air and fuel vapor) when the fuel vapor is desorbed from the canister and purged to the engine. The direction of flow of the purge gas will be hereinafter called a "purge direction."

When the negative pressure is applied to the canister by the negative pressure applying device, the purge gas may forcibly flow toward the downstream side (i.e., toward the intake pipe) of the negative pressure applying device. Because the pressure adjusting device is located on the downstream side of the negative pressure applying device with respect to the purge direction, in some cases, it may be possible that a positive pressure is applied to the upstream side of the negative pressure applying device with respect to the purge direction. Such application of the positive pressure may be caused by the following first to third reasons. The first reason is a pressure loss caused by a piping resistance against flow of the gas, for example, in the pressure regulating device or the purge passage. The second reason is a difference between the time when the operation of the pressure regulating device is stopped and the time when the operation of the negative pressure applying device is stopped. The third reasons is a difference between a set pressure of the pressure regulating device and the pressure applied by the negative pressure applying device.

Regarding the second reason, if the electromagnetic valve is used as the pressure regulating device, the electromagnetic valve may immediately close upon receipt of a stop signal from the ECU. On the other hand, due to an inertia force, the vacuum pump as the negative pressure applying device may not immediately stop its operation upon receipt of a stop signal from the ECU. Therefore, even in the case that the pressure regulating device and the negative pressure applying device have simultaneously received the stop signals from the ECU, it may be possible that the vacuum pump still operates due to the inertia force after the electromagnetic valve has stopped. If this occurs, a pressure in a portion of the purge passage between the electromagnetic valve and the vacuum pump may gradually increase. Regarding the third reason, if the set pressure of the pressure adjusting device is smaller than the pressure applied by the negative pressure applying device, a pressure in a portion of the purge passage between the electromagnetic valve and the vacuum pump may also gradually increase. This is because an amount of flow of the gas flowing through the pressure regulating device may be smaller than an amount of flow of the gas supplied from the negative pressure applying device. Also, for the first reason, an amount of flow of the gas flowing through the pressure regulating device may become smaller than an amount of flow of the gas supplied from the negative pressure applying device.

As explained above, location of the pressure regulating device on the downstream side of the negative pressure applying device with respect to the purge direction may cause a portion of the purge passage on the downstream side to have a positive pressure more than necessary during the continued operation of the negative pressure applying device for any of the first to third reasons or any other reasons. In this case, it may be also possible to cause the pressure in a portion of the purge passage on the upstream side of the negative pressure applying device to be shifted to a positive pressure. Even in this case, the fuel vapor may forcibly flow from within the canister toward the intake pipe during the continued operation of the negative pressure applying device. However, a positive pressure may be applied to the canister after the negative pressure applying device is stopped. When this occurs, the gas contained within the canister may flow into the atmosphere passage resulting in the fuel vapor being discharged to the atmosphere via the atmosphere passage.

Therefore, there is a need in the art for preventing or inhibiting fuel vapor from flowing from a canister into the atmosphere after a negative pressure applying device is stopped.

SUMMARY

In one aspect according to the present disclosure, a fuel vapor processing apparatus may include a canister in fluid communication with a fuel tank via a vapor passage for adsorbing fuel vapor generated in the fuel tank. The canister may be further in fluid communication with an atmosphere via an atmosphere passage and may be further in fluid communication with an intake pipe via a purge passage. The intake pipe may supply an atmospheric air to an internal combustion engine. The fuel vapor processing apparatus may further include a negative pressure applying device and a pressure adjusting device. The negative pressure applying device may apply a negative pressure to the canister so as to desorb fuel vapor from within the canister, so that the desorbed fuel vapor is supplied to the intake pipe via the purge passage. The pressure adjusting device may adjust the negative pressure applied by the negative pressure applying device. The negative pressure applying device may be disposed in the purge passage. The pressure adjusting device may be disposed in a purge passage portion of the purge passage communicating between the fuel tank and the negative pressure applying device.

With the arrangement of the pressure adjusting device in the purge passage portion communicating between the fuel tank and the negative pressure applying device, the pressure adjusting device may be located on an upstream side of the negative pressure applying device with respect to a purge direction. Therefore, it may be possible to inhibit the canister-side pressure to have a positive value during the application of the negative pressure by the negative pressure applying device. As a result, it may be possible to prevent the fuel vapor from being discharged to the atmosphere from the canister.

Even in the case that any of the first to third reasons described in connection with the known art has been applied, it may not result in the pressure on the upstream side of the negative pressure applying device in the purge direction having a positive value. For example, even in the case that the amount of the gas flowing through the pressure adjusting device is smaller than the amount of the gas supplied by the negative pressure applying device due to the first reason or the third reason, it merely results in an increase in a negative pressure in the purge passage portion communicating between the negative pressure applying device and the pressure adjusting device. Therefore, the upstream side of the negative pressure applying device in the purge direction may maintain a negative pressure even after the negative pressure applying device stops the application of the negative pressure. As a result, the fuel vapor may not flow to the atmosphere from within the canister. This may also apply in the case of the second reason (i.e., a difference between the time when the pressure regulating device is stopped and the time when the negative pressure applying device is stopped).

For the purpose of explanation, a pressure in a portion of the purge passage communicating between the intake pipe and the negative pressure applying device may be hereinafter referred to as a first pressure, and a pressure in a portion of the purge passage communicating between the negative pressure applying device and the pressure adjusting device will be hereinafter referred to as a second pressure.

The purge passage may be configured such that the first pressure in the purge passage portion communicating between the intake pipe and the negative pressure applying device normally has a negative value during application of the negative pressure by the negative pressure applying device.

With this arrangement, it may be possible to appropriately inhibit the pressure on the upstream side of the negative pressure applying device in the purge direction from becoming a positive value.

However, the amount of air supplied from the intake pipe to the engine may vary with a change of a valve opening amount of a throttle valve disposed in the intake pipe, for example, according to a stepping amount of an accelerator pedal of a vehicle. If the stepping amount of the accelerator pedal has been largely increased to fully open the throttle valve, it may be possible that the pressure within the intake pipe becomes to be substantially equal to the atmosphere pressure. If the negative pressure applying device applies the negative pressure in this state, it may be possible that the first pressure in the purge passage portion communicating between the intake pipe and the negative pressure applying device may have a positive value. In such a case, if the second pressure in the purge passage portion between the negative pressure applying device and the pressure adjusting device has a negative value, the first pressure may be reduced or cancelled by the second pressure after stopping the application of the negative pressure by the negative pressure applying device.

In view of this, the pressure adjusting device may be configured such that, even if it happened that the first pressure has a positive value during the application of the negative pressure by the negative pressure applying device, the second pressure in the purge passage portion communicating between the negative pressure applying device and the pressure adjusting device has a negative value, an absolute value of which is larger than the positive value of the first pressure. With this arrangement, it may be possible to reliably prevent a positive pressure from being applied to the canister after stopping the application of the negative pressure by the negative pressure applying device.

In one embodiment, the pressure adjusting device may be a part of the purge passage having an inner diameter that is smaller than an inner diameter of a remaining portion of the purge passage and is also smaller than an inner diameter of each of the atmosphere passage, the vapor passage and the intake pipe. With this arrangement, it may be possible to achieve the above advantages with a simple construction, while it may be possible to reduce the number of components and the manufacturing cost of the fuel vapor processing apparatus.

In another embodiment, the pressure adjusting device may be an electromagnetic valve. A valve opening ratio, i.e., a valve opening degree, of the electromagnetic valve may be controlled with respect to a duty ratio. This arrangement may allow the second pressure to be freely set.

DETAILED DESCRIPTION OF EXAMPLARY EMBODIMENTS

First, second and third embodiments will now be described with reference to the drawings.

First Embodiment

Figure 1:
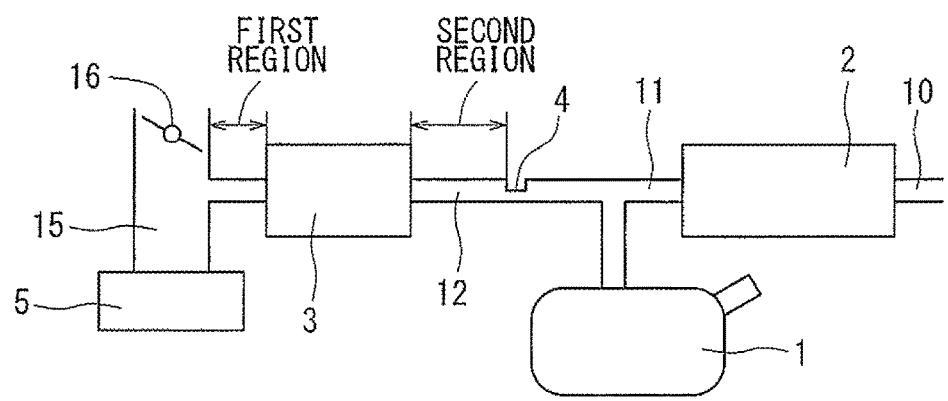
FIG. 1 is a schematic diagram illustrating a fuel vapor processing apparatus according to a first embodiment.

Referring to FIG. 1, there is shown a fuel vapor processing apparatus according to the first embodiment, which may be used for a vehicle, such as an automobile. The fuel vapor processing apparatus may generally include a canister 2 for adsorbing fuel vapor generated in a fuel tank 1, a purge pump 3 for generating a negative pressure applied to the canister 2, a pressure adjusting device 4 for adjusting the negative pressure applied to the canister 2 by the purge pump 3, an atmosphere passage 10 for communicating the canister 2 with the atmosphere, a vapor passage 11 for communicating between the fuel tank 1 and the canister 2, and a purge passage 12 for communicating the canister 2 with an intake pipe 15 of a vehicle engine 5 that may be an internal combustion engine.

The fuel tank 1 may be a pressure-resisting tank that can be hermetically closed. A highly volatile fuel, such as gasoline, may be stored in the fuel tank 1. A fuel pump (not shown) may be disposed within the fuel tank 1 for pumping and supplying the fuel to the engine 5 under pressure.

The canister 2 may contain an adsorbent (not shown) that can adsorb fuel vapor that may be generated in the fuel tank 1. The adsorbent may be a porous material that can allow passage of air but can capture or adsorb fuel vapor. Activated carbon may be suitably used as the adsorbent.

The purge pump 3 may be a vacuum pump and may serve as a negative pressure applying device. The purge pump 3 may be disposed in the purge passage 12.

The intake pipe 15 may supply air (atmospheric air) to the engine 5. A throttle valve 16 may be disposed in the intake pipe 15 for opening and closing the intake pipe 15. An engine control unit (ECU) (not shown in FIG. 1) may control a valve open ratio (i.e., a valve opening degree) of the throttle valve 16 according to a stepping amount of an accelerator pedal of a vehicle (not shown), or the like. The ECU may include a microprocessor and memory, such as a RAM and a ROM, adapted to store control programs for executing various controls that will be explained in further detail later. The purge passage 12 may be branched off from a part of the vapor passage 11 and may communicate with the intake pipe 15 at a position on a downstream side of the throttle valve 16.

The pressure adjusting device 4 may be disposed in a purge passage portion of the purge passage 12 communicating between the fuel tank 1 and the purge pump 3. In other words, the pressure adjusting device 4 may be disposed on an upstream side of the purge pump 3 with respect to a purge direction that is a direction of flow of fuel vapor from the canister 2 to the intake pipe 15 during a purge operation. The pressure adjusting device 4 may not be disposed in the vapor passage 11, through which fuel vapor generated in the fuel tank 1 flows into and adsorbed by the canister 2.

The pressure adjusting device 4 may be a passage part of the purge passage 12 having an inner diameter that is the smallest of inner diameters of all of the passages in the fuel vapor processing apparatus. More specifically, the inner diameter of the pressure adjusting device 4 may be smaller than the remaining portion of the purge passage 12 and may be also smaller than an inner diameter of each of the atmosphere passage 10, the vapor passage 11 and the intake pipe 15. It may be possible that each or any of the atmosphere passage 10, the vapor passage 11, the remaining portion of the purge passage 12 and the intake pipe 15 may not have a uniform inner diameter throughout its length. Also in this case, it is only necessary for the pressure adjusting device 4 to have an inner diameter that is the smallest of them. Further, it may be possible that the inner diameter of the remaining portion of the purge passage 12 is larger than the inner diameter of each or any of the atmosphere passage 10, the vapor passage 11 and the intake pipe 15 as long as the inner diameter of the pressure adjusting device 4 is the smallest of them.

In this embodiment, a passage portion of the purge passage 12 communicating between the intake pipe 15 and the purge pump 3 will be referred to as a first region, and a passage portion of the purge passage 12 communicating between the purge pump 3 and the pressure adjusting device 4 will be referred to as a second region. In addition, the internal pressure of the first region will be referred to as a first pressure, and the internal pressure of the second region will be referred to as a second pressure. In this embodiment, the inner diameter of the first region of the purge passage 12 may be determined such that the first pressure normally has a negative value during the operation of the purge pump 3. For example, if the output of the purge pump 3 is 30-60 L/min, the inner diameter of the first region may be set to be equal to or more than 6 mm.

Even with the above determination, the first pressure may have a positive value during the operation of the purge pump 3, depending on the pressure within the intake pipe 15. For this reason, the inner diameter of the pressure adjusting device 4 may be determined such that the second pressure has a negative value, an absolute value of which is larger than that of the first pressure that may have a positive value during the operation of the purge pump 3. This may be achieved, for example, by setting the inner diameter of the pressure adjusting device 4 to be 30% to 80% of the inner diameter of the first region of the purge passage 12. For example, if the inner diameter of the first region is set to be equal to or more than 6 mm, the inner diameter of the pressure adjusting device 4 may be set to be about 2 to 5 mm.

The process performed by the fuel vapor processing apparatus will now be described. During parking of a vehicle (i.e., when the engine 5 is stopped, for example, by the operation of an ignition switch) or during refueling of the fuel tank 1, fuel vapor generated in the fuel tank 1 may flow into the canister 2 via the vapor passage 11 together with air. In this state, the purge pump 3 may be stopped. Then, the fuel vapor may be adsorbed by the adsorbent contained in the canister 2, while the air may pass through the adsorbent and may be discharged to the atmosphere via an atmosphere port (not shown) of the atmosphere passage 10. Therefore, the pressure within the fuel tank 1 may be released, so that the fuel tank 1 can be prevented from being damaged without leading to atmospheric pollution.

During vehicle travel (i.e., during the operation of the engine 5), the purge pump 3 may be operated, so that a gas (i.e., a mixture of air and fuel vapor) may forcibly flow from within the canister 2 toward the intake pipe 15. The direction of flow of the gas in this case may be called a purge direction. The time for starting the operation of the purge pump 3 may be controlled by the ECU. In this way, a negative pressure may be applied to the fuel tank 1 and also to the canister 2, so that fuel vapor adsorbed by the canister 2 may be desorbed from the canister 2 and may be purged into the intake pipe 15 via the purge passage 12 together with the fuel vapor generated in the fuel tank 1. Simultaneously with this, the atmosphere air may be introduced into the canister 2 via the atmosphere passage 10, so that desorption of fuel vapor from the canister 2 can be promoted.

During this operation, if the amount of gas flowing through the pressure adjusting device 4 is smaller than the amount of gas pumped by the purge pump 3, the negative pressure within each of the first region and the second region may increase. Therefore, no positive pressure may be applied to the canister 2. For this reason, fuel vapor may not be dissipated from within the canister 2 to the atmosphere via the atmosphere passage 10. This may also apply even in the case that the purge pump 3 is operated during a short time by the inertia force after the purge pump 3 has received a stop signal from the ECU.

Further, during vehicle travel, the valve opening degree of the throttle valve 16 may be controlled according to the stepping amount of the accelerator pedal (not shown), or the like, so that the amount of air supplied to the engine 5 may be controlled to provide a given air-fuel ratio for the engine 5. The valve opening degree of the throttle valve 16 as well as the air-fuel ratio may be controlled by the ECU. Therefore, the pressure within the intake pipe 15 may normally have a negative value. In addition, the first pressure within the first region of the purge passage 12 may normally have a negative value due to the setting of the inner diameter of the purge passage 12. Also in these respects, no positive pressure may be applied to the canister 2 after the purge pump 3 has stopped.

However, if the throttle valve 16 is fully opened, for example, as a result of stepping on the accelerator pedal by a large amount, it may be possible that the pressure within the intake pipe 15 becomes substantially equal to the atmospheric pressure. If the purge pump 3 is operated in this state, it may be possible that the first pressure of the first region comes to have a positive value. On the other hand, the second pressure of the second region may have a negative value, an absolute value of which is larger than the positive value that may have resulted for the first pressure of the first region. Therefore, even in the event that the first pressure of the first region has come to have a positive value during the operation of the purge pump 3, the positive pressure of the first region may be cancelled by the negative pressure of the second region after the purge pump 3 is stopped. As a result, it may be possible to ensure that no positive pressure is applied to the canister 2 after the purge pump 3 is stopped.

Second Embodiment

Figure 2:
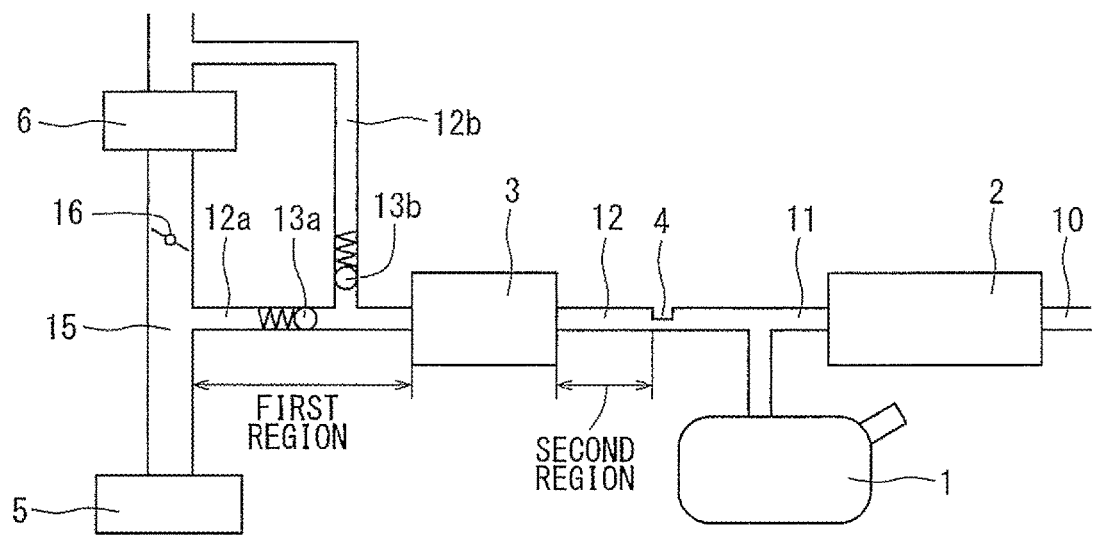
FIG. 2 is a schematic diagram illustrating a fuel vapor processing apparatus according to a second embodiment.

A fuel vapor processing apparatus according to the second embodiment will now be described with reference to FIG. 2. The second embodiment is a modification of the first embodiment and the basic construction may be the same as that of the first embodiment. Therefore, in FIG. 2, like members are given the same reference numerals as the first embodiment, and the description of these members will be omitted.

Thus, similar to the first embodiment, the fuel vapor processing apparatus, according to the second embodiment, may generally include the canister 2 for adsorbing fuel vapor generated in the fuel tank 1, the atmosphere passage 10 for communicating the canister 2 with the atmosphere, the vapor passage 11 for communicating between the fuel tank 1 and the canister 2, the purge passage 12 for communicating between the intake pipe 15 and the canister 2, the purge pump 3 for generating a negative pressure to be applied to the canister 2 for desorbing fuel vapor from the canister 2, and the pressure adjusting device 4 for adjusting the negative pressure generated by the purge pump 3. Also in this embodiment, the pressure adjusting device 4 may be disposed in a portion of the purge passage 12 between the fuel tank 1 and the purge pump 3 and may be a passage part of the purge passage 12, which has an inner diameter that is the smallest of inner diameters of all of the passages of the fuel vapor processing apparatus.

The second embodiment may be different from the first embodiment in that a supercharger 6 may be disposed in the intake pipe 15 at a position on the upstream side of the throttle valve 16. Further, the first region may be branched into two portions. More specifically, the purge passage 12 in the first region may include a first passage portion 12a and a second passage portion 12b. The first passage portion 12a may communicate the purge pump 3 with the intake pipe 15 at a position on the downstream side of the throttle valve 16. The second passage portion 12b may communicate the purge pump 3 with the intake pipe 15 at a position on the upstream side of the supercharger 6. A check valve 13a may be disposed in the first passage portion 12a and may be opened when a pressure difference between its upstream side and its downstream side becomes equal to or larger than a predetermined value. Similarly, a check valve 13b may be disposed in the second passage portion 12b and may be opened when a pressure difference between its upstream side and its downstream side becomes equal to or larger than a predetermined value. The predetermined value (i.e., a valve opening pressure) for the check valve 13b may be equal to that for the check valve 13a.

During parking of a vehicle (i.e., when the engine 5 is stopped, for example, by the operation of an ignition switch) or during refueling of the fuel tank 1, fuel vapor generated in the fuel tank 1 may flow into the canister 2 via the vapor passage 11 and may be adsorbed by the canister 2 in the same manner as described in the first embodiment. Further, during vehicle travel, the purge pump 3 may be operated to apply a negative pressure to the fuel tank 1 and also to the canister 2, so that fuel vapor adsorbed by the canister 2 may be desorbed from the canister 2 and may be purged into the intake pipe 15 via the purge passage 12 together with the fuel vapor generated in the fuel tank 1 in the same manner as described in the first embodiment.

In the case of the second embodiment, the supercharger 6 may be disposed in the intake pipe 15. Therefore, the pressure on the upstream side of the supercharger 6 may be substantially equal to the atmospheric pressure, while the pressure on the downstream side of the supercharger 6 may tend to have a positive value. If the pressure on the downstream side of the supercharger 6 has a negative value, the check valve 13a disposed in the first passage portion 12a of the purge passage 12 may be opened due to the negative pressure applied from the intake pipe 15 and due to the pressure applied by the purge pump 3. Therefore, in this case, the gas may flow along a route similar to that in the first embodiment. On the other hand, if the pressure on the downstream side of the supercharger 6 has a positive value, the check valve 13a disposed in the first passage portion 12a may not be opened due to this positive pressure. However, the check valve 13b disposed in the second passage portion 12b may be opened due to the pressure applied by the purge pump 3, so that the gas may flow through the second passage portion 12b.

As described above, the first pressure in the first region of the second embodiment may have a positive value. However, due to the presence of the pressure adjusting device 4, the second pressure in the second region may have a negative value, an absolute value of which is larger than the resulted positive value of the first pressure. Therefore, after the purge pump 3 is stopped, the negative pressure of the second region may cancel the positive pressure of the first region. As a result, it may be possible to ensure that no positive pressure is applied to the canister 2 after the purge pump 3 is stopped.

Third Embodiment

Figure 3:
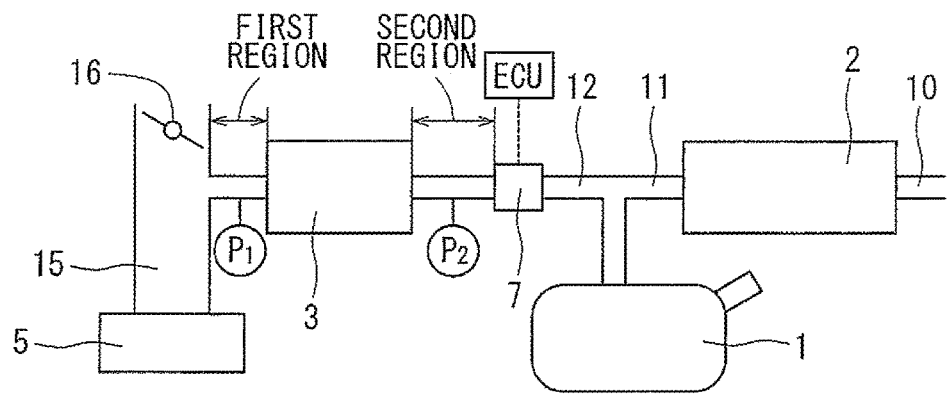
FIG. 3 is a schematic diagram illustrating a fuel vapor processing apparatus according to a third embodiment.
Figure 4:
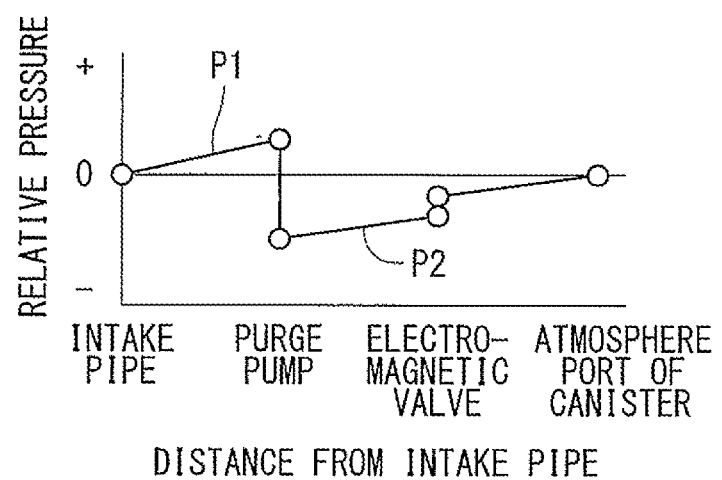
FIG. 4 is a graph showing a relationship between pressures in an intake pipe, a purge pump and an atmosphere port of a canister.

A fuel vapor processing apparatus according to the third embodiment will now be described with reference to FIG. 3. Also, the third embodiment is a modification of the first embodiment and the basic construction may be the same as that of the first embodiment. Therefore, in FIG. 3, like members are given the same reference numerals of the first embodiment and the description of these members will be omitted.

Thus, similar to the first embodiment, the fuel vapor processing apparatus according to the third embodiment may generally include the canister 2 for adsorbing fuel vapor generated in the fuel tank 1, the atmosphere passage 10 for communicating the canister 2 with the atmosphere, the vapor passage 11 for communicating between the fuel tank 1 and the canister 2, the purge passage 12 for communicating between the intake pipe 15 and the canister 2, and the purge pump 3 for generating a negative pressure to be applied to the canister 2 for desorbing fuel vapor from the canister 2. The fuel vapor processing apparatus may further include a pressure adjusting device 7 for adjusting the negative pressure generated by the purge pump 3. Also in this embodiment, the pressure adjusting device 7 may be disposed in a passage portion of the purge passage 12 communicating between the fuel tank 1 and the purge pump 3.

The third embodiment may be different from the first embodiment in that an electromagnetic valve is used as the pressure adjusting device 7. In the following description, the pressure adjusting device 7 will be also referred to as the electromagnetic valve 7. The electromagnetic valve 7 may be controlled by the ECU with respect to time of opening the valve and the time of closing the valve (hereinafter called "valve opening/closing time"). More specifically, the ECU may control the valve opening/closing time of the electromagnetic valve 7 based on a duty ratio of the valve opening time to the valve closing time, so that the valve opening ratio (i.e., the flow ratio of the gas) may be controlled. Further, in the third embodiment, a first pressure sensor P1 may detect the first pressure in the first region, and a second pressure sensor P2 may detect the second pressure in the second region.

During parking of a vehicle (i.e., when the engine 5 is stopped, for example, by the operation of an ignition switch) or during refueling of the fuel tank 1, fuel vapor generated in the fuel tank 1 may flow into the canister 2 via the vapor passage 11 and may be adsorbed by the canister 2 in the same manner as described in the first embodiment. Further, during vehicle travel, the purge pump 3 may be operated to apply a negative pressure to the fuel tank 1 and also to the canister 2, so that fuel vapor adsorbed by the canister 2 may be desorbed from the canister 2 and may be purged into the intake pipe 15 via the purge passage 12 together with the fuel vapor generated in the fuel tank 1 in the same manner as described in the first embodiment.

In the case of the third embodiment, the ECU may control the valve opening ratio of the electromagnetic valve 7 according to the first pressure in the first region detected by the first pressure sensor P1. More specifically, if the pressure within the intake pipe 15 is a negative pressure, it is unlikely that the first pressure within the first region has a positive value. Therefore, the valve open ratio of the electromagnetic valve 7 may be controlled such that the detected pressure of the first pressure sensor P1 (i.e., the first pressure in the first region) has a negative value. On the other hand, with the valve open ratio of the electromagnetic valve 7 controlled in this way, if the pressure within the intake pipe 15 comes to have a positive value, it may be possible that the first pressure in the first region also has a positive value. In such a case, the electromagnetic valve 7 may be controlled to decrease the valve opening ratio, so that the second pressure in the second region may have a negative value, an absolute value of which is larger than the positive value of the first pressure. Therefore, after the purge pump 3 is stopped, the negative pressure of the second region may cancel the positive pressure of the first region. As a result, it may be possible to ensure that no positive pressure is applied to the canister 2 after the purge pump 3 is stopped.

Although the electromagnetic valve 7 is controlled by the ECU in the third embodiment, it may be possible to use a separate controller from the ECU for controlling the electromagnetic valve 7.

The various examples described above in detail with reference to the attached drawings are intended to be representative of the invention and thus not limiting. The detailed description is intended to teach a person of skill in the art to make, use and/or practice various aspects of the present teachings and thus is not intended to limit the scope of the invention. Furthermore, each of the additional features and teachings disclosed above may be applied and/or used separately or with other features and teachings to provide improved fuel vapor processing apparatuses and/or methods of making and using the same.

Moreover, the various combinations of features and steps disclosed in the above detailed description may not be necessary to practice the invention in the broadest sense, and are instead taught to describe representative examples of the invention. Further, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed as informational, instructive and/or representative and may thus be construed separately and independently from each other. In addition, all value ranges and/or indications of groups of entities are also intended to include possible intermediate values and/or intermediate entities for the purpose of original written disclosure, as well as for the purpose of restricting the claimed subject matter.

What is claimed is:

1. A fuel vapor processing apparatus comprising:
   a canister in fluid communication with a fuel tank via a vapor passage and configured to adsorb fuel vapor generated in the fuel tank;
   wherein the canister is further in fluid communication with an atmosphere via an atmosphere passage and is further in fluid communication with an intake pipe via a purge passage, the intake pipe being configured to supply atmospheric air to an internal combustion engine;
   a negative pressure applying device configured to apply a negative pressure to the canister so as to desorb fuel vapor from within the canister, so that the desorbed fuel vapor is supplied to the intake pipe via the purge passage; and
   a pressure adjusting device configured to adjust the negative pressure applied by the negative pressure applying device;
   wherein the negative pressure applying device is disposed in the purge passage; and wherein the pressure adjusting device is disposed in a purge passage portion of the purge passage communicating between the fuel tank and the negative pressure applying device.

2. The fuel vapor processing apparatus according to claim 1, wherein the purge passage is configured such that a first pressure in a first region of the purge passage communicating between the intake pipe and the negative pressure applying device has a negative value during application of the negative pressure by the negative pressure applying device.

3. The fuel vapor processing apparatus according to claim 2, wherein the pressure adjusting device is configured such that, even in a case that the first pressure has a positive value during application of the negative pressure by the negative pressure applying device, a second pressure in a second region of the purge passage communicating between the negative pressure applying device and the pressure adjusting device has a negative value, an absolute value of which is larger than the positive value of the first pressure.

4. The fuel vapor processing apparatus according to claim 1, wherein the pressure adjusting device comprises a part of the purge passage having an inner diameter that is smaller than an inner diameter of a remaining portion of the purge passage and is also smaller than an inner diameter of each of the atmosphere passage, the vapor passage and the intake pipe.

5. The fuel vapor processing apparatus according to claim 1, wherein the pressure adjusting device comprises an electromagnetic valve, wherein a valve opening ratio of the electromagnetic valve is controlled based on a duty ratio.

6. A fuel vapor processing apparatus comprising:
a canister in fluid communication with a fuel tank via a vapor passage and configured to adsorb fuel vapor generated in the fuel tank;
wherein the canister is further in fluid communication with an atmosphere via an atmosphere passage and is further in fluid communication with an intake pipe via a purge passage, the intake pipe being configured to supply atmospheric air to an internal combustion engine;
a negative pressure applying device disposed in the purge passage and configured to apply a negative pressure to the canister so as to desorb fuel vapor from within the canister, so that the desorbed fuel vapor is supplied to the intake pipe via the purge passage; and
a pressure adjusting device configured to prevent the canister from application of a positive pressure after the negative pressure applying device stops the application of the negative pressure to the canister.

7. The fuel vapor processing apparatus according to claim 6, wherein the pressure adjusting device is disposed in the purge passage on an upstream side of the negative pressure applying device with respect to a direction of flow of the desorbed fuel vapor from the canister toward the intake pipe.

8. The fuel vapor processing apparatus according to claim 7, wherein:
the purge passage includes a first region between the negative pressure applying device and the intake pipe, and a second region between the pressure adjusting device and the negative pressure applying device; and
the pressure adjusting device is configured to adjust a second pressure in the second region such that an absolute value of the second pressure is larger than a positive value of the first pressure during the application of the negative pressure by the negative pressure applying device to the canister.

9. The fuel vapor processing apparatus according to claim 7, wherein:
the pressure adjusting device comprises a part of the purge passage having an inner diameter smaller than an inner diameter of a remaining portion of the purge passage.

10. The fuel vapor processing apparatus according to claim 7, wherein:
the intake pipe includes a throttle valve and a supercharger disposed therein;
the supercharger is located on an upstream side of the throttle valve with respect to a flow of intake air into the engine;
the purge passage includes a first passage portion and a second passage portion;
the first passage portion is in fluid communication between the negative pressure applying device and a first part of the intake pipe on a downstream side of the throttle valve:
the second passage portion is in fluid communication between the negative pressure applying device and a second part of the intake pipe on the upstream side of the supercharger;
the fuel vapor processing apparatus further includes a first check valve disposed in the first passage portion and a second check valve disposed in the second passage portion;
each of the first and second check valves is configured to inhibit flow of air from within the intake pipe toward the negative pressure applying device.

11. The fuel vapor processing apparatus according to claim 7, wherein:
the pressure adjusting device comprises an electromagnetic valve;
the fuel vapor processing apparatus further comprises:
a first pressure sensor configured to detect a first pressure in a first region of the purge passage between the negative pressure applying device and the intake pipe; and
a controller configured to control the electromagnetic valve based on the first pressure detected by the first pressure sensor.

12. The fuel vapor processing apparatus according to claim 11, further comprising a second pressure sensor configured to detect a second pressure in a second region of the purge passage between the pressure adjusting device and the electromagnetic valve;
wherein the controller is further configured to control the electromagnetic valve such that the second pressure has a negative value, an absolute value of which is larger than the first pressure when the first pressure is a positive value.

* * * * *